United States Patent
Olsen

(10) Patent No.: US 11,267,084 B1
(45) Date of Patent: Mar. 8, 2022

(54) DIPSTICK ADAPTER LEAK REPAIR METHOD AND KIT

(71) Applicant: Mitchell S. Olsen, Grass Valley, CA (US)

(72) Inventor: Mitchell S. Olsen, Grass Valley, CA (US)

(*) Notice: Subject to any disclaimer, the term of this patent is extended or adjusted under 35 U.S.C. 154(b) by 152 days.

(21) Appl. No.: 16/735,477

(22) Filed: Jan. 6, 2020

Related U.S. Application Data

(60) Provisional application No. 62/789,644, filed on Jan. 8, 2019.

(51) Int. Cl.
*B23P 6/00* (2006.01)
*G01F 23/04* (2006.01)
*B60S 5/00* (2006.01)
*B25B 27/00* (2006.01)

(52) U.S. Cl.
CPC ............ *B23P 6/00* (2013.01); *B25B 27/0028* (2013.01); *B25B 27/0035* (2013.01); *G01F 23/04* (2013.01); *B23P 2700/50* (2013.01); *B60S 5/00* (2013.01)

(58) Field of Classification Search
CPC ........ G01F 23/04; B23P 6/00; B23P 2700/50; B25B 27/0028; B25B 27/0035; B60S 5/00; B62D 65/00; Y10T 29/49719; Y10T 29/4973; Y10T 29/49746; F16B 43/001; F16B 43/003; F16J 15/061
See application file for complete search history.

(56) References Cited

U.S. PATENT DOCUMENTS

| | | | | |
|---|---|---|---|---|
| 4,191,872 A | * | 3/1980 | Sorenson | H02B 1/044 200/296 |
| 5,752,665 A | * | 5/1998 | Wason | B02C 17/225 241/299 |
| 9,285,259 B1 | | 3/2016 | Metzger | |
| 9,671,272 B1 | | 6/2017 | Metzger | |
| 2011/0005333 A1 | * | 1/2011 | Ball | G01F 15/185 73/861 |
| 2011/0298184 A1 | * | 12/2011 | Aurelius | F16J 15/064 277/630 |
| 2012/0224933 A1 | * | 9/2012 | Anderson | H02G 3/0675 411/313 |

(Continued)

OTHER PUBLICATIONS

"Oil Level Gauge Adapter Repair Kit for 1994-2003", available on web Dec. 13, 2017, DieselOrings.com, http://www.dieselorings.com:80/8-011-oil-level-gauge-oil-pan-repair-kit.html (Year: 2017).*

(Continued)

*Primary Examiner* — Matthew P Travers
(74) *Attorney, Agent, or Firm* — Heisler & Associates

(57) ABSTRACT

A leaking oil dipstick adapter is repaired by removing a flanged nut from a threaded extension of the dipstick adapter. A gasket and preferably also gasket seal forming material are applied surrounding the threaded extension of the dipstick adapter and adjacent to an exterior side of the wall of the oil pan. A washer is applied adjacent to this gasket. A nut is threaded onto the threaded extension of the dipstick adapter and applies a compression force on the washer, compressing the gasket against the exterior surface of the wall of the oil pan. A tool is preferably used to retain the dipstick adapter and keep it from falling into an interior of the oil pan during the repair.

13 Claims, 4 Drawing Sheets

(56) References Cited

U.S. PATENT DOCUMENTS

2016/0245341 A1* 8/2016 Thomas .................. F16C 35/02
2021/0293315 A1* 9/2021 Cerreta .................. F16C 17/04

OTHER PUBLICATIONS

Oil Pan Repair Kit Instructions, available on web Jun. 16, 2015, DieselOrings.com (Year: 2015).*
dieselorings.com; #8-011 Oil Level Gauge—Oil Pan Repair Kit; https:///www.dieselorings.com/8-011-oil-level-fill-gauge-oil-pan-repair-kit.html; accessed on Dec. 28, 2019.

* cited by examiner

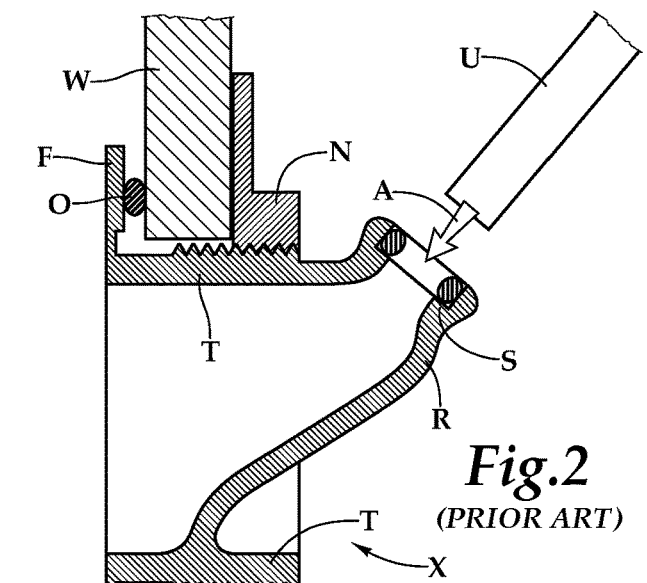
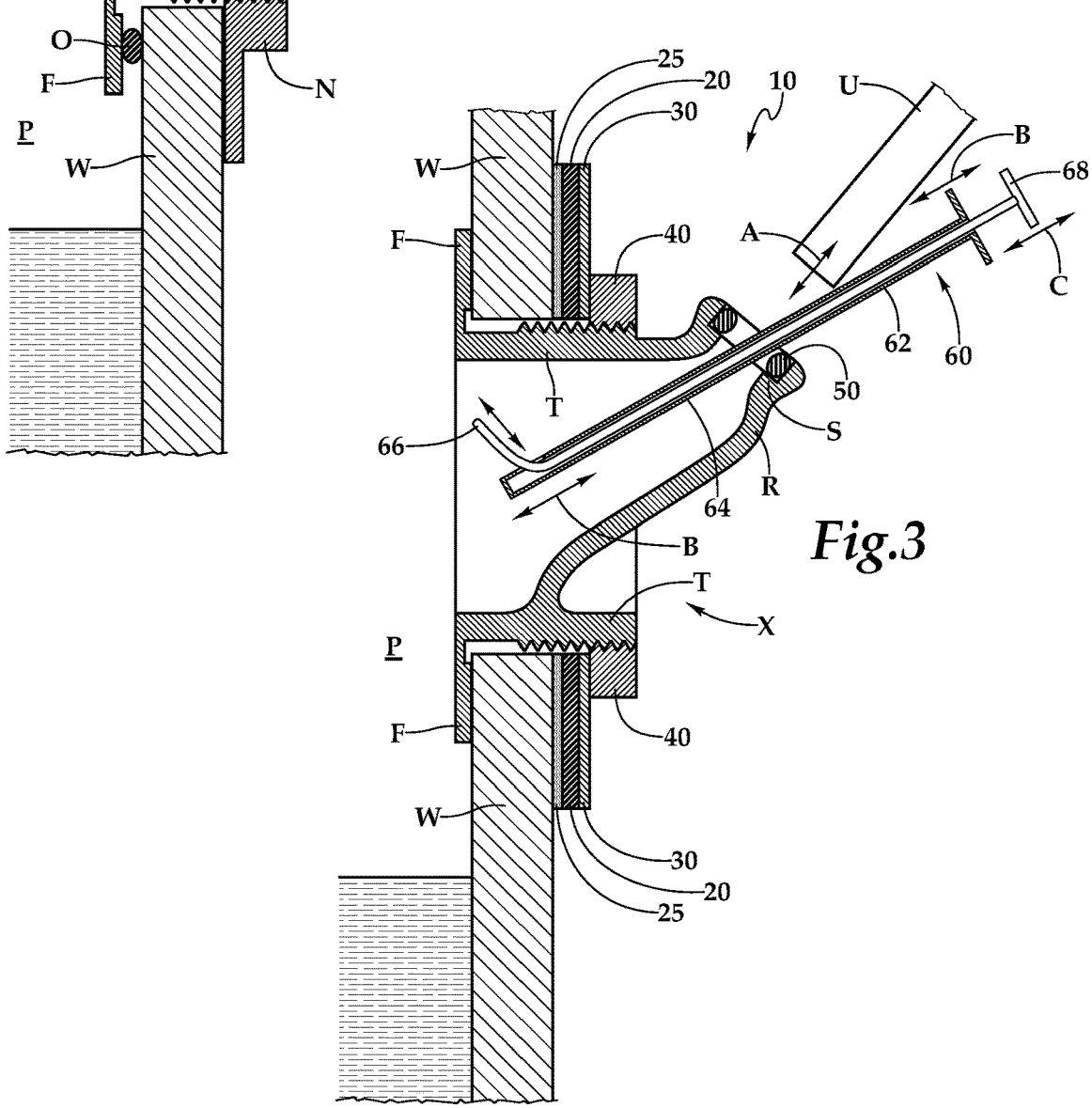

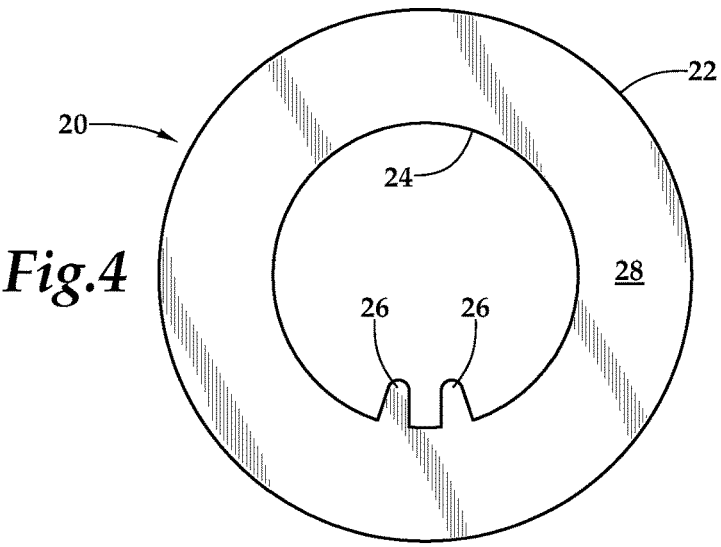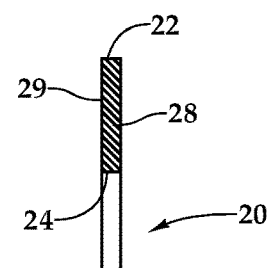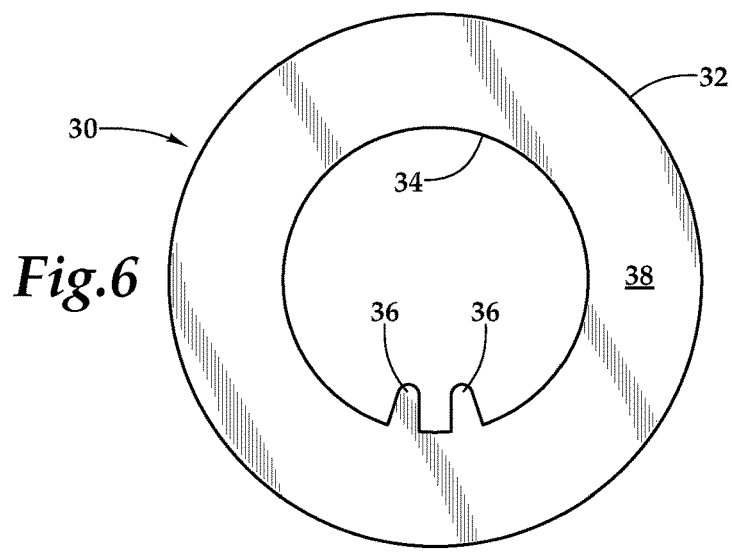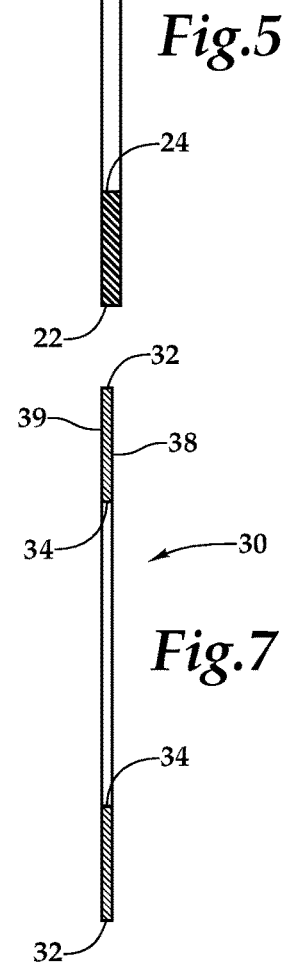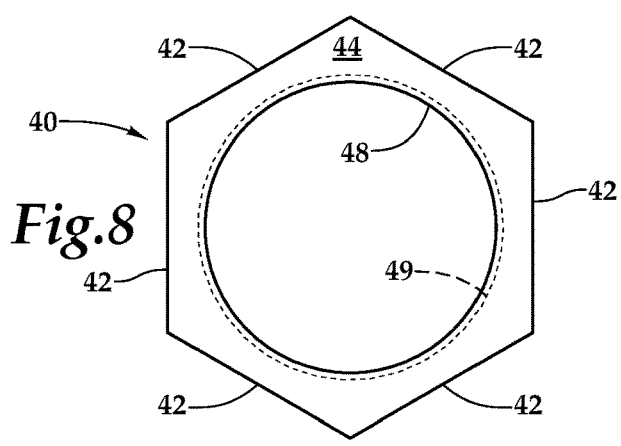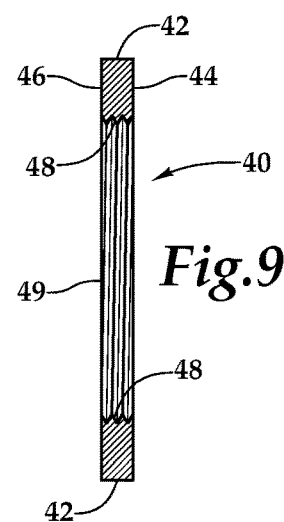

DIPSTICK ADAPTER LEAK REPAIR METHOD AND KIT

CROSS-REFERENCE TO RELATED APPLICATIONS

This application claims benefit under Title 35, United States Code § 119(e) of U.S. Provisional Application No. 62/789,644 filed on Jan. 8, 2019.

FIELD OF THE INVENTION

The following invention relates to engine oil dipstick adapters at an interface in an engine wall where a dipstick of an internal combustion engine accesses an oil pan of the engine. The dipstick measures a level of oil within the oil pan of the engine and allows for direct inspection of the oil therein. More particularly, this invention relates to methods and apparatuses for repairing leaks in dipstick adapters of internal combustion engines.

BACKGROUND OF THE INVENTION

Oil dipstick adapters are combustion engine parts which surround and support an interface between an oil dipstick tube and an oil pan or other outer housing of a lower portion of the combustion engine. The oil dipstick adapter connects to the wall of the oil pan and has a hollow cylindrical portion which connects to the dipstick tube, and allows a dipstick passing down through the dipstick tube to pass into the oil pan and measure a level of the oil within the engine (as well as allowing for inspection of oil color and other characteristics of the oil), such as for diagnosing engine health and troubleshooting engine problems.

Some oil dipstick adapters can leak, especially after significant time has passed and significant operation hours/miles/cycles have been encountered for the engine. For many engine designs, such leaks can be exceptionally difficult to successfully repair. A typical repair methodology is to replace worn out parts with new parts. Such a straightforward approach is not particularly economical when the oil dipstick adapter is of a type which prevents it from being fully accessed and removed from an exterior of the oil pan, but rather can only be removed and fully accessed from within an interior of the oil pan. In such situations, significant disassembly of large portions of the engine is required, merely to provide full access to the oil dipstick adapter for replacement or repair.

One engine which is particularly representative of this problem is a diesel 7.3 L engine (manufactured by Navistar International Corporation of Lisle, Illinois and designated as "T444E") which is in common usage on pickup trucks (such as those of the Ford Motor Company of Dearborn, Michigan provided under the trademark "POWER STROKE") for many model years from the late 20th century and early 21st century. In such engines, the oil dipstick adapter includes a flange which abuts an interior surface of the oil pan wall, compressing an O-ring between the flange and the interior surface of the oil pan wall for sealing purposes. A threaded extension extends from this flange through a hole in the oil pan wall and surrounds the hollow cylinder which supports the dipstick tube extending therefrom. Such an oil dipstick adapter can have the cylinder and threaded extension accessed from outside of the oil pan, but the size of the flange on the inside of the oil pan keeps the oil dipstick adapter from passing through the hole in the wall of the oil pan, so that the oil dipstick adapter cannot be removed from an exterior of the oil pan.

Such lack of access for the oil dipstick adapter from the outside of the oil pan is problematic because the O-ring is susceptible to decomposition or other modes of failure over time, resulting in a significant leak between the flange and the hole in the oil pan wall. The standard approach of disassembling the engine sufficiently to fully access the adapter and damaged O-ring from an interior of the oil pan is considered by some shop manuals to require approximately 15-20 hours of mechanic time. Often such a major leak occurs when the engine has around 200,000 or fewer miles. Such a relatively large diesel engine typically has significant remaining useful life associated therewith, if this dipstick adapter leak can be effectively repaired.

When a vehicle and/or an engine is getting older, it is more difficult to justify expending large amounts of time and/or money to keep the engine and/or vehicle in operation. However, if an older engine which could otherwise operate for perhaps hundreds of thousands of additional miles can be relatively simply repaired, significant benefits are provided to the owner/operator of the vehicle in repairing and continuing its operation. Furthermore, environmental benefits accrue from not needing to dispose of such an engine which still has significant useful life remaining therein. Accordingly, a need exists for a method and apparatus for simplifying the repair of such a dipstick adapter leak, and repair of similar equipment.

SUMMARY OF THE INVENTION

With this invention, a method and kit/apparatus are provided for repairing a leak associated with a dipstick adapter, which can be accomplished entirely from an exterior of the oil pan of the engine, to provide the benefits and solutions to the problem identified above. This invention is described in particular with regard to a repair of an oil leak around an oil dipstick adapter for a 7.3 L International diesel engine. However, this method and apparatus, either directly or with appropriate modifications, could be adapted to other engines, either diesel or otherwise, associated with oil dipstick adapters or other ports or interfaces to oil pans or other portions of an engine or similar device.

Before the method of this invention is executed, the starter of the vehicle (typically for the 7.3 L diesel engine) needs to be removed to provide appropriate access near the oil dipstick adapter. If other equipment on other vehicles need to be initially removed to provide access to the oil dipstick adapter, such equipment can first be removed. As a next step, the oil dipstick and oil dipstick tube are removed from the oil dipstick adapter. Details of this removal will vary based on how the dipstick tube is supported as it extends down to the oil dipstick adapter.

After the oil dipstick tube and oil dipstick have been removed, the mechanic should have clear access to the oil dipstick adapter and surrounding portions of an exterior wall of the oil pan of the engine. As a next step, a tool is utilized to securely grasp or at least retain the adapter, so that it can be kept from falling down into the oil pan. For instance, needle-nose vise grips could grasp the hollow cylinder of the oil dipstick adapter which supports the proximal end of the oil dipstick tube. Other tools which can pass through the hollow cylinder of the oil dipstick adapter and hold the oil dipstick adapter to the tool could alternatively be utilized.

The flanged nut is then removed from the dipstick adapter by rotation until it is threaded off of the threaded extension of the oil dipstick adapter. This flanged nut can then be passed over the tool for complete removal. At this stage, nothing (other than perhaps friction) is holding the oil dipstick adapter within the hole in the oil pan wall, but the tool is holding the adapter so it will not fall into the oil pan interior. The tool can be manipulated to move the oil dipstick adapter inwardly into an interior of the oil pan and otherwise allow for positioning of the adapter as desired. An O-ring which is sandwiched between a flange on the oil dipstick adapter and the interior wall of the oil pan can be grasped, such as bypassing a finger through the hole in the oil pan and grabbing the O-ring, and the O-ring can be pulled through the hole in the oil pan and fed up over the proximal end of the tool for complete removal of this O-ring. It is conceivable that the O-ring may have broken, so that when performing the step, care can be taken to collect as much of the O-ring as possible, so that it does not need to be left within the oil pan. A "grabber tool" can optionally be used for O-ring retrieval.

A next step according to this invention is preferably to thoroughly clean the exterior of the oil pan wall around the hole in the oil pan. This cleaning can also involve degreasing chemicals or other cleaning tools or techniques, until a smooth and clean exterior surface of the oil pan is presented surrounding the hole in the oil pan wall. With this invention, the seal around the oil dipstick adapter is moved from an interior side of the oil pan to an exterior side of the oil pan, so that this cleaning step is beneficial.

Replacement parts are provided in a kit for use according to this invention, in the most preferred form of this invention. As an alternative, the existing flanged nut could conceivably be utilized, along with a gasket forming liquid material. Most preferably, and to provide a highly reliable seal, the replacement kit includes a specialized sealing ring formed of elastomeric material, such as rubber, which is configured to be placed around the oil dipstick adapter and directly adjacent to the outer wall of the oil pan. Sealing material such as gasket forming material or other glue-like material which is typically dispensed from a tube as a liquid, but then hardens and fills voids, is provided on a surface of this sealing ring which is placed adjacent to the wall of the oil pan on the extension side thereof. This placement step occurs first over the proximal end of the retainer tool that is holding the adapter, and then by having the sealing ring pass along the length of the retainer tool until it comes adjacent to the outer surface of the oil pan.

The sealing ring typically beneficially includes a pair of teeth thereon which can mash with a pair of gaps between gear-like structures on a perimeter of the threaded extension of the oil dipstick adapter, so that these corresponding gear teeth on the oil dipstick adapter are filled by these teeth on the sealing ring. Sealing material can also be placed upon the threads of the extension of the oil dipstick adapter to both act as a lock assisting type material and for further sealing purposes.

Next, a washer is preferably placed adjacent to the sealing ring on a side of the sealing ring opposite the oil pan wall. This washer also preferably has fingers thereon which match the teeth on the sealing ring and which can mesh with the gear teeth on the extension of the oil dipstick adapter. This washer provides a bearing surface for compression of the sealing ring against the outer surface of the oil pan, and to provide a tight and oil leak proof seal between the oil pan and the sealing ring and the hole in the oil pan wall.

Finally, a nut having female threads matching the male threads on the oil dipstick adapter threaded extension is passed over the retainer tool and tightened onto the oil dipstick adapter extension, until this nut tightens down against the washer. As the nut is tightened, the washer is compressed against the sealing ring, and the sealing ring is compressed against the oil pan for a tight sealing fit. While the existing flange nut could conceivably be utilized, by utilizing the specialty washer and the sealing ring, the teeth thereon can fit tightly against the corresponding gear structure on the extension of the oil dipstick adapter. Furthermore, the washer can be made much thinner than a standard washer to accommodate the space taken up by the sealing ring and associated gasket-forming (or other hardenable liquid) material placed between the sealing ring and the outer wall of the oil pan.

After the nut has been fully tightened, the retainer tool can be detached and the oil dipstick tube can be placed back into the hollow cylinder of the oil dipstick adapter, preferably with a new small O-ring at a tip thereof, for sealing of the oil dipstick tube to the hollow cylinder of the oil dipstick adapter. Finally, this oil dipstick tube can be appropriately anchored by reversing the step of removing the oil dipstick tube, and the oil dipstick can then be replaced back into the oil dipstick tube. Finally, the starter and/or any other items which were required to be removed to provide access to the oil dipstick adapter can be replaced.

A simple and thorough resealing of the oil dipstick adapter is thus achieved, to solve this leak problem in a simple and effective fashion. If the system does fail over time, a new similar kit can be used, and the repair can be relatively easily re-done by following the same procedures identified above, and still not requiring access to an interior of the oil pan of the engine.

OBJECTS OF THE INVENTION

Accordingly, a primary object of the present invention is to provide a method for repairing a leaking dipstick adapter on a wall of an oil pan of an internal combustion engine.

Another object of the present invention is to provide a method for repairing a leaking dipstick adapter which is easy to perform and which can be performed in a short amount of time with relatively inexpensive materials.

Another object of the present invention is to provide a method for repairing a leaking dipstick adapter which avoids having any materials fall into and/or remain within an interior of the oil pan in an un-fixed fashion, potentially moving about within the oil pan.

Another object of the present invention is to provide a method for repairing a leaking dipstick adapter which does not require replacement of the dipstick adapter.

Another object to the present invention is to provide a repair kit for repairing a leaking dipstick adapter on a wall of an oil pan of an internal combustion engine.

Another object to the present invention is to provide a repair kit which is easy to install in a relatively short period of time for repairing a leaking dipstick adapter.

Another object to the present invention is to provide a system for repairing a leak in an interface between a dipstick adapter and a wall of an oil pan of an internal combustion engine.

Another object to the present invention is to save time in repairing a leaking dipstick adapter on a wall of an oil pan of an internal combustion engine.

Another object of the present invention is to move a seal around a dipstick adapter from an interior side of a wall of an oil pan of an internal combustion engine to an exterior side of the wall of the oil pan.

Other further objects of the present invention will become apparent from a careful reading of the included drawing figures, the claims and detailed description of the invention.

BRIEF DESCRIPTION OF THE DRAWINGS

FIG. 2 is a detail of a portion of that which is shown in FIG. 1, and further showing how prior art dipstick adapters interface with a wall of an oil pan of the internal combustion engine in FIG. 1.

FIG. 3 is a detail similar to that which is shown in FIG. 2, but after repair of the leaking dipstick adapter, utilizing the method and apparatus of this invention.

FIG. 4 is an exterior plan view of a gasket, the gasket forming part of a kit for repairing a leaking dipstick adapter, according to one embodiment of this invention.

FIG. 5 is an edge full sectional view of that which is shown in FIG. 4.

FIG. 6 is an exterior plan view of a washer forming part of the kit for repairing a leaking dipstick adapter, according to one embodiment of this invention.

FIG. 7 is an edge full sectional view of that which is shown in FIG. 6.

FIG. 8 is an exterior plan view of a nut forming part of the kit for repairing a dipstick adapter, according to one embodiment of this invention.

FIG. 9 is an edge full sectional view of that which is shown in FIG. 8.

DESCRIPTION OF THE PREFERRED EMBODIMENT

Figure 1:
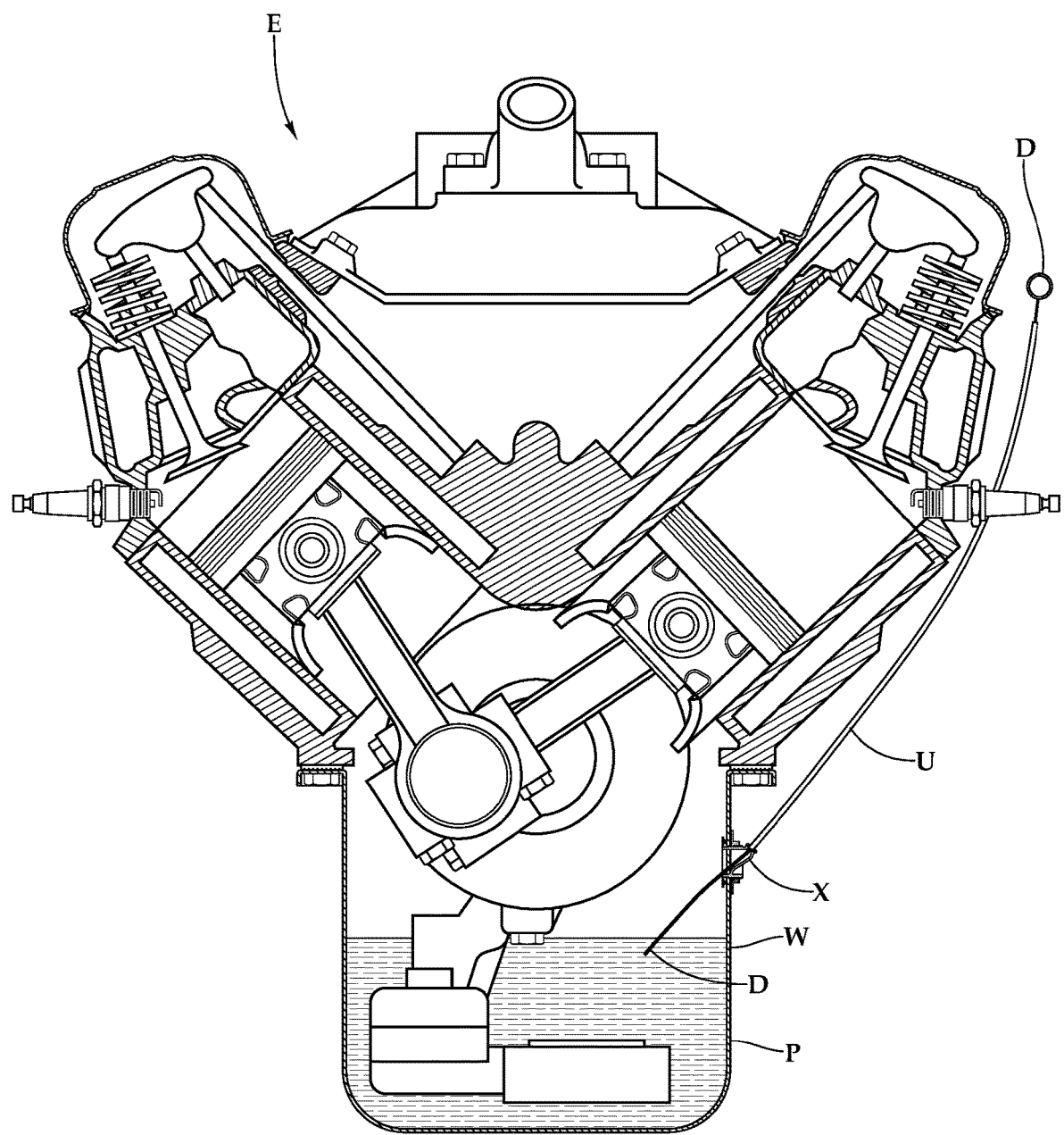
FIG. 1 is a front elevation full sectional view of an internal combustion engine showing where a dipstick adapter is located and with a dipstick therein, the dipstick adapter, when leaking, having such leak repaired by the method and example apparatuses disclosed herein.

Referring to the drawings, wherein like reference numerals represent like parts throughout the various drawing figures, reference numeral 10 is directed to a repair kit assembly (FIGS. 3 and 10) for repairing a leaking dipstick adapter X passing through a wall W of an oil pan P of an engine E, such as an internal combustion engine E. The dipstick adapter X can be difficult to replace when it develops a leak between the dipstick adapter X and the wall W, with the kit 10 and associated method of this invention useful to repair this leaking condition in a simple and fast process.

Figure 10:
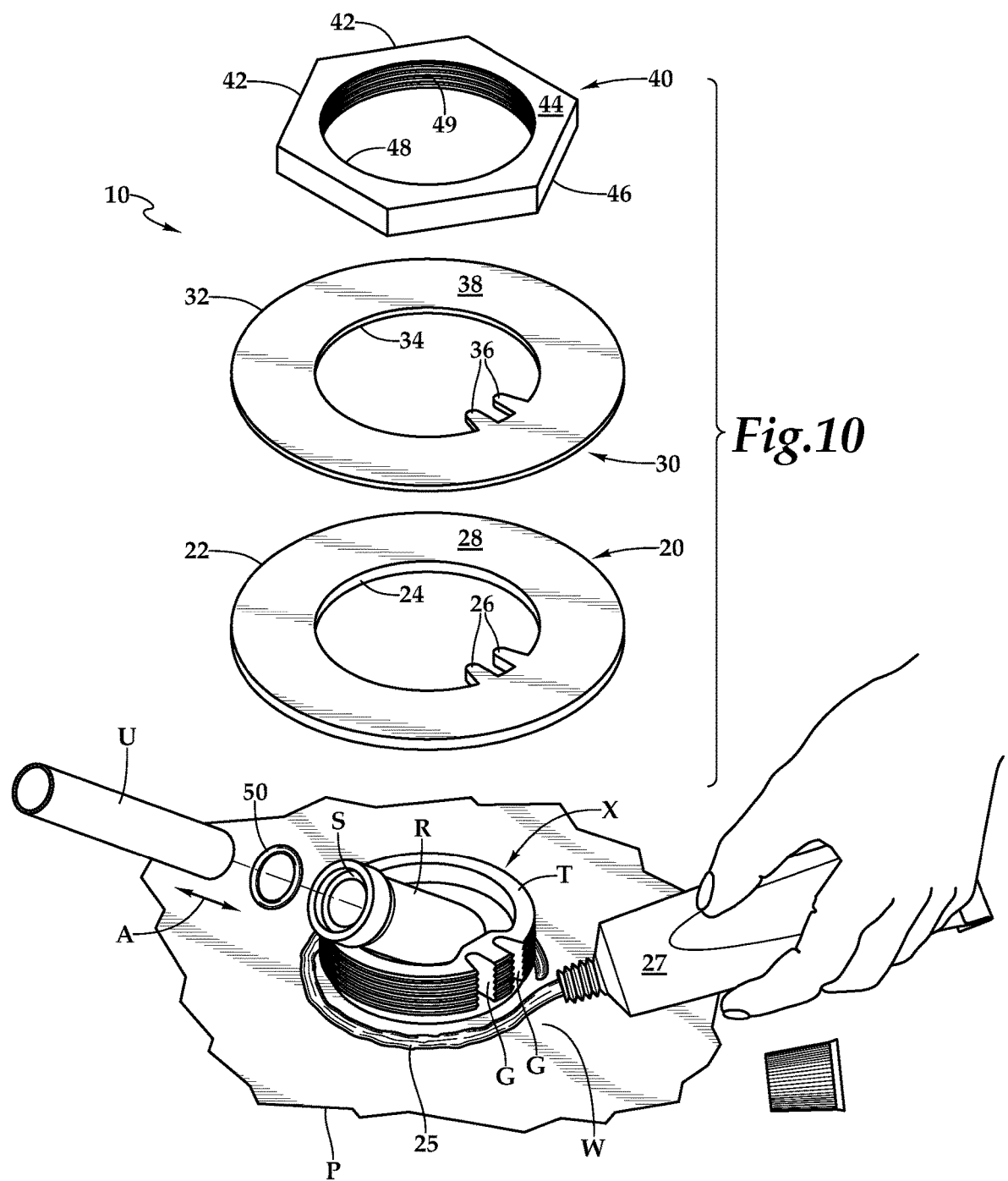
FIG. 10 is an exploded perspective view of an exterior of an oil pan and dipstick adapter illustrating how parts of the kit of FIGS. 4-9 can be used according to a method of this invention to repair the leaking dipstick adapter.

In essence, and with particular reference to FIGS. 3 and 10, basic details of the kit assembly 10 of this invention are described, according to one embodiment. The separate elements of the kit 10 generally replace an O-ring O and a flanged nut N associated with the original dipstick adapter X. The O-ring O is removed and is not replaced with anything on the interior surface of the wall W. Instead, a gasket 20, and preferably also a hardenable liquid gasket maker 25 are located surrounding a threaded extension T of the dipstick adapter X on an exterior side of the wall W. A washer 30 preferably is located surrounding the threaded extension T of the adapter X and pressing against the gasket 20. A nut 40 threads onto the threads of the threaded extension T to compress the washer 30 against the gasket 20 and form a tight seal against the exterior surface of the wall W. Preferably also a tube O-ring 50 is provided to replace a previous similar item located between a tube U of the dipstick adapter X and a tube receiver R of the dipstick adapter X. The method can be performed utilizing a retainer tool 60 (FIG. 3) or other retainer tool to keep the dipstick adapter X from falling into an interior of the oil pan P of the engine E, during the repair.

More specifically, and with particular reference to FIGS. 1 and 2, more extensive details are provided of the engine E and dipstick adapter X which is repaired by the repair kit assembly 10 and repair method according to one embodiment of this invention. The engine E being repaired by the method and assembly 10 of this invention could be any engine which has a dipstick adapter X which facilitates passage of a dipstick D through a wall W of an oil pan P or similar portion of an engine E, such as to measure an amount and other characteristics of oil (or other liquids) within the engine E or subassemblies there of (e.g. brake fluids, power steering fluids, radiator fluids, air-conditioning fluids, etc.).

The original dipstick adapter includes a threaded extension T passing through a hole in a wall W of the oil pan P of the engine E. A tube receiver R extends from an exterior portion of the dipstick adapter X and holds a dipstick tube U extending away from the tube receiver R. A dipstick D can pass through this tube U and then through the dipstick adapter X to access an interior of the oil pan P. The prior art dipstick adapter X prevents leakage through this hole in the wall W by placing an O-ring O surrounding the dipstick adapter X against an interior side of the wall W. This O-ring O is compressed by a flange F of the dipstick adapter X to form a tight seal against the interior surface of the wall W. When this O-ring O fails, oil can readily leak around the flange F and the flanged nut N through the hole in the wall W. Tightening of the flange nut N does not remedy this problem. Replacing the O-ring O requires access to an interior of the oil pan P, which generally involves major disassembly of the engine E, such procedure being complex, time-consuming and expensive.

To repair this leaking dipstick adapter X, the flange nut N is removed and replaced with the repair kit assembly 10 of this invention, as shown in FIGS. 3-10. The repair kit assembly 10 includes a gasket 20 surrounding the threaded extension T of the dipstick adapter X on an exterior side of the wall W. This gasket 20 can include both a solid structure and a hardenable liquid portion 25, or could be merely the hardenable liquid portion 25 or merely the solid gasket 20. In the embodiment disclosed, both a hardenable liquid gasket portion 25 is provided as well as a solid gasket 20, as two parts of a new seal for the adapter X. This seal could be provided by just the hardenable liquid portion 25 or just the solid structure of the gasket 20 in other embodiments. The solid structure of the gasket 20 is an annular mass of compressible material which is sufficiently flexible and elastic to avoid cracking or other breakage when compressed, and to tightly seal against adjacent surfaces when compressed. A neoprene rubber material provides one satisfactory material for this solid structure of the gasket 20.

The solid structure of the gasket 20 includes an outer edge 22 opposite an inner edge 24, which are preferably both substantially circular in form. The inner edge 24 has this circular form interrupted by a pair of teeth 26 which extend radially inwardly from the inner edge 24. The gasket 20 includes an exterior surface 28 opposite an interior surface 29 which are preferably planar and parallel to each other, defining a thickness of the gasket 20. This gasket 20 is typically relatively thin, such as being approximately $\frac{1}{16}$ inch in thickness before compression. Preferably, the inner edge 24 of the gasket 20 is sized to just barely fit over the threaded extension T of the dipstick adapter X. In one embodiment, this inner edge 24 is sized so that it has a slight friction fit against the threaded extension T of the dipstick adapter X, so that the gasket 20 not only seals against the exterior surface of the wall W, but also can compress and seal somewhat against the threaded extension T of the dipstick adapter X, especially when the gasket 20 is compressed.

The hardenable liquid gasket maker material 25 is initially provided in a container 27 (FIG. 10) which stores the gasket forming material 25 in a liquid form. After it is exposed to air, this gasket maker material 25 undergoes a slow hardening process where it hardens into a gasket material which still has resilient flexible characteristics but transitions from being liquid to being solid. Even in liquid form, it is typically a sticky paste in form. The gasket forming material 25 is provided by squeezing the container 27 and causing a trail of gasket forming material 25 to be placed in an annular ring against the exterior surface of the wall W surrounding the threaded extension T of the dipstick adapter X. The solid structure of the gasket 20 is then placed over the threaded extension T of the dipstick adapter X and pressed against this liquid gasket maker material 25. As an alternative, the liquid gasket maker material 25 could be placed upon the interior surface 29 of the solid structure of the gasket 20 and then the solid structure of the gasket 20 could be placed over the threaded extension T of the dipstick adapter X, for simultaneous placement of both the solid structure of the gasket 20 and the hardenable liquid gasket maker material 25.

Preferably liquid gasket maker material 25 is included directly adjacent to the inner edge 24 of the gasket 20 and upon the teeth 26 which extend radially inwardly away from the inner edge 24. When the solid structure of the gasket 20 is compressed, the hardenable liquid gasket maker material 25 and the solid structure of the gasket 20 can expand radially inwardly somewhat from the inner edge 24 to seal against portions of the threaded extension T of the dipstick adapter X, for sealing of the hole in the wall W surrounding the threaded extension T of the dipstick adapter X, to prevent leakage therethrough.

While the nut 40 could compress the gasket 20 directly, most preferably a washer 30 is interposed between the nut 40 and the gasket 20. The washer 30 preferably has a form similar to that of the gasket 20, but is formed of a rigid material, such as steel (e.g. stainless steel), rather than being formed of a resilient rubber material. Thus, in one form the washer 30 includes an outside edge 32 opposite an inside edge 34 and with fingers 36 similar in shape to the teeth 26 of the gasket 20 extending radially inwardly from the inside edge 34 of the washer 30. The washer 30 has a thickness defined by a distance between an exterior side 38 and an interior side 36 which are preferably planar and parallel to each other. A thickness of the washer 30 is typically somewhat less than a thickness of the gasket 20, but can have a similar thickness after compression of the gasket 20. In one embodiment, a thickness of the washer 30 is approximately 3/16 of an inch (0.0375 inch).

The nut 40 includes facets 42 on an outermost portion thereof and threads 49 on a cylindrical surface 48 extending inwardly therefrom. The nut 40 also includes a top surface 44 opposite a bottom surface 46. The threads 49 of the nut 40 are sized to interface with the threads of the threaded extension T of the adapter X. The nut 40 can be threaded onto the threaded extension T of the dipstick adapter X until it compresses the washer 30 against to the gasket 20. In one embodiment, the nut 40 could merely be the flanged nut N originally provided with the dipstick adapter. However, with the inclusion of the gasket 20 against the exterior surface of the wall W, the flanged nut N typically does not have sufficient amounts of threads thereof engaged with the threads on the threaded extension T to securely hold to the threaded extension T of the dipstick adapter X. The nut 40 is relatively thin between the top surface 44 and bottom surface 46, and thinner than the flanged nut N.

The threads of the nut 40 can be formed so that a very beginning of the threads 49 of the nut 40 (at either end of the threads 49 as the nut 40 is reversible in a typical embodiment) is free of damage, formed of a sufficiently hard material, and optionally to have tighter tolerance relative to the threads of the threaded extension T of the dipstick adapter X. In this way, the nut 40 can engage the threads of the threaded extension T of the dipstick adapter X, even with just a small amount of initial engagement therebetween, and the nut 40 can then be tightened effectively, compressing against the washer 30 and compressing the gasket 20 against the extra surface of the wall W to provide a tight seal around the threaded extension T of the dipstick adapter X and against the extra surface of the wall W surrounding the dipstick adapter X.

With tight tolerance precisely maintained on the threads 49 of the nut 40, any propensity of oil to migrate through the hole in the wall W around the dipstick adapter X, and along the threads of the threaded extension T, can be restrained by such tight tolerances. In one embodiment, the washer 30 and nut 40 are provided together as a single structure, rather than as two separate structures. In such an embodiment, the threads 49 can extend down onto the inside edge 34 of the washer 30, and such a washer 30 would not include the fingers 36.

In use an operation, and with particular reference to FIGS. 3 and 10, details of the method of use of the repair kit assembly 10 of this invention are described, according to one embodiment. Initially, the flanged nut N is removed from the threaded extension T of the dipstick adapter X. This step is preceded by removal of the dipstick tube U from the tube receiver R. The tube O-ring 50 typically surrounds this tube U, and is often in poor condition, and so is preferably replaced in one embodiment of the repair method of this invention. In one embodiment, the tube U could remain attached to the tube receiver R so that the dipstick tube U acts as a retainer to keep the dipstick adapter X from falling into an interior of the oil pan P during the repair of this invention. However, most preferably the tube U is first removed (along arrow A of FIG. 10) and then a retainer tool 60 (FIG. 3) is utilized to securely hold the dipstick adapter X and keep it from falling into the oil pan P.

One form of retainer tool 60 (FIG. 3) is elongate in form with an outer sheath 62. An inner semi-flexible shaft 64 is located within the other sheath 62 and extends from a tip 66 to a handle 68. The tool 60 can be placed through the tube receiver R (along arrow B of FIG. 3) and then the inner semi-flexible shaft 64 can be advanced (along arrow C of FIG. 3) within the outer sheath 62 to cause the tip 66 of the flexible shaft 64 to extend out of a hole, preferably on a lateral side of an inner end of the outer sheath 62. The tip 66 thus extends at least somewhat laterally from this interior end of the outer sheath 62, and sufficient, being only semi-flexible, to keep the interior end of the retainer tool 60 from being able to come out of the tube receiver R (until the tip 66 is retracted into the sheath 62 for removal). The dipstick adapter X is thus securely held by the tool 60 so that it does not fall into the interior of the oil pan P in a manner which will be difficult to retrieve. Other forms of tools could be utilized similar to the retainer tool 60, such as vice grips which could grab the tube receiver R.

Once the flanged nut N has been removed, the dipstick adapter X is free to move some relative to the wall W. With the dipstick adapter X held firmly by the retainer tool 60 or some other form of retainer, it can be loosened from the wall W and the old failed O-ring O (FIG. 2) can typically be reached, such as with a finger of a mechanic, or with an appropriate grabbing tool, and extracted through the hole in the wall W around the threaded extension T, for removal of this O-ring O. The O-ring O is often deteriorated into multiple parts, and these parts are preferably removed, but could at least partially fall down into the oil pan P, and would typically be captured by the oil filter, although less than optimal.

The exterior surface of the wall W of the oil pan P is then preferably cleaned and moved if necessary. The gasket 20, including both the hardenable liquid gasket maker 25 and solid gasket 20 portion are placed upon the exterior surface of the wall W surrounding the hole and surrounding the threaded extension T of the dipstick adapter X. The teeth 26 on the gasket 20 fit within the gaps G in the threaded extension T of the dipstick adapter X. The washer 30 is then placed over the gasket 20 with the fingers 36 also fitting within the gaps G in the threaded extension of the dipstick adapter X. Finally, the nut 40 is threaded onto the threaded extension T of the dipstick adapter X, and tightened until the washer 30 compresses the gasket 20 against the exterior surface of the wall W. The liquid gasket maker 25 hardens, and along with portions of the inner edge 24 of the gasket 20 extends radially inwardly slightly against the threads of the threaded extension T of the dipstick adapter X, to provide a tight seal and prevent leakage.

Retainer tool 60 can then be disengaged and the dipstick tube U can be replaced within the tube receiver R. A new tube O-ring 50 can be placed against a seat S within the tube receiver R of the dipstick adapter X to seal the dipstick tube U. The dipstick D can then be replaced back into the dipstick tube U.

This disclosure is provided to reveal a preferred embodiment of the invention and a best mode for practicing the invention. Having thus described the invention in this way, it should be apparent that various different modifications can be made to the preferred embodiment without departing from the scope and spirit of this invention disclosure. When embodiments are referred to as "exemplary" or "preferred" this term is meant to indicate one example of the invention, and does not exclude other possible embodiments. When structures are identified as a means to perform a function, the identification is intended to include all structures which can perform the function specified. When structures of this invention are identified as being coupled together, such language should be interpreted broadly to include the structures being coupled directly together or coupled together through intervening structures. Such coupling could be permanent or temporary and either in a rigid fashion or in a fashion which allows pivoting, sliding or other relative motion while still providing some form of attachment, unless specifically restricted.

What is claimed is:

1. A method for repairing a leak around an oil dipstick adapter in a wall of an oil pan of an engine, including the steps of:

using a tool passing through a hollow cylindrical dipstick tube holder of the oil dipstick adapter to hold the oil dipstick adapter to the tool;

removing a flanged nut from a threaded extension of the oil dipstick adapter;

placing a seal on an exterior of the oil pan wall surrounding a hole for the oil dipstick adapter; and placing and tightening a nut onto the threaded extension of the oil dipstick adapter and at least partially compressing the seal on the exterior of the oil pan of the engine;

wherein the seal includes a flexible sealing ring having an annular form sized to fit around the extension of the oil dipstick adapter;

wherein the sealing ring includes teeth extending inwardly which fit into gaps in a perimeter of the threaded extension of the oil dipstick adapter.

2. The method of claim 1 wherein the seal of said placing step includes a hardenable liquid gasket material.

3. The method of claim 1 wherein the sealing ring is formed of an elastomeric material.

4. The method of claim 3 wherein a washer is placed between the sealing ring and the nut.

5. The method of claim 4 wherein said washer has teeth extending inwardly and sized to fit into the gaps in the extension of the oil dipstick adapter.

6. The method of claim 1 including the further step of removing an original O-ring between a flange of the oil dipstick adapter and an inner surface of the oil pan wall.

7. A method for repairing a leaking dipstick adapter passing through a wall of an internal combustion engine, the method including the steps of:

removing a flanged nut from a threaded extension of the dipstick adapter, located on an exterior side of the wall;

placing a gasket against the exterior side of the wall, the gasket surrounding the threaded extension of the dipstick adapter; and threading a nut onto the threaded extension of the dipstick adapter, until the gasket is compressed against the exterior side of the wall;

wherein the gasket is a solid mass of compressible material sized to surround the threaded extension of the dipstick adapter, and wherein the gasket includes inwardly extending structures extending radially inwardly therefrom, the inwardly extending structures sized to fit within gaps extending radially into the threaded extension of the dipstick adapter.

8. The method of claim 7 wherein said gasket includes a hardenable liquid gasket material, the gasket material initially being in liquid form placed onto the exterior side of the wall surrounding the threaded extension of the dipstick adapter, and the gasket material hardening into a solid form after initial placement in said placing step.

9. The method of claim 7 wherein said placing step includes the gasket being a solid thin annular mass of compressible material sized to surround the threaded extension of the dipstick adapter, said annular mass having substantially planar opposing surfaces.

10. The method of claim 9 wherein said placing step further includes liquid gasket forming material placed onto the exterior side of the wall surrounding the dipstick adapter, and with the solid thin annular mass of compressible material on a side of the liquid gasket forming material opposite the exterior surface of the wall surrounding the dipstick adapter.

11. The method of claim 7 wherein said threading step is preceded by locating a washer on a side of the gasket opposite the exterior surface of the wall, said washer having an annular form sized to surround the threaded extension of the dipstick adapter.

12. The method of claim 11 wherein the washer includes inwardly extending structures extending radially inwardly therefrom, the inwardly extending structures sized to fit within gaps extending radially into the threaded extension of the dipstick adapter.

13. The method of claim 7 including the further step of holding the dipstick adapter at least after said removing step with a tool located on the exterior side of the wall, the tool keeping the dipstick adapter from falling into an interior of the internal combustion engine.

* * * * *